United States Patent
Kusakabe et al.

(10) Patent No.: US 12,017,442 B2
(45) Date of Patent: Jun. 25, 2024

(54) NONWOVEN FABRIC FOR STERILIZATION PACKAGING MATERIAL

(71) Applicant: Asahi Kasei Kabushiki Kaisha, Tokyo (JP)

(72) Inventors: Junichi Kusakabe, Tokyo (JP); Yusuke Sasaki, Tokyo (JP); Masaaki Mori, Tokyo (JP); Takashi Komatsu, Tokyo (JP)

(73) Assignee: Mitsui Chemicals Asahi Life Materials Co., Ltd., Tokyo (JP)

( * ) Notice: Subject to any disclaimer, the term of this patent is extended or adjusted under 35 U.S.C. 154(b) by 0 days.

(21) Appl. No.: 17/439,840

(22) PCT Filed: Mar. 19, 2020

(86) PCT No.: PCT/JP2020/012502
§ 371 (c)(1),
(2) Date: Sep. 16, 2021

(87) PCT Pub. No.: WO2020/196340
PCT Pub. Date: Oct. 1, 2020

(65) Prior Publication Data
US 2022/0097342 A1    Mar. 31, 2022

(30) Foreign Application Priority Data

Mar. 22, 2019  (JP) .................................. 2019-054667
Mar. 22, 2019  (JP) .................................. 2019-054809

(51) Int. Cl.
*B32B 5/22*  (2006.01)
*B32B 5/02*  (2006.01)
*B32B 5/26*  (2006.01)
*D04H 3/007*  (2012.01)
*D04H 3/011*  (2012.01)

(52) U.S. Cl.
CPC .............. *B32B 5/269* (2021.05); *B32B 5/022* (2013.01); *D04H 3/007* (2013.01); *D04H 3/011* (2013.01); *B32B 2250/02* (2013.01); *B32B 2250/03* (2013.01); *B32B 2250/20* (2013.01); *B32B 2250/40* (2013.01); *B32B 2262/0253* (2013.01); *B32B 2262/0276* (2013.01); *B32B 2262/144* (2021.05); *B32B 2307/31* (2013.01); *B32B 2307/54* (2013.01); *B32B 2307/558* (2013.01); *B32B 2307/582* (2013.01); *B32B 2307/718* (2013.01); *B32B 2307/7242* (2013.01); *B32B 2307/7265* (2013.01); *B32B 2307/732* (2013.01); *B32B 2439/80* (2013.01); *D10B 2321/022* (2013.01); *D10B 2331/04* (2013.01); *D10B 2401/04* (2013.01); *D10B 2401/06* (2013.01); *D10B 2509/00* (2013.01)

(58) Field of Classification Search
CPC ..... B32B 5/269; B32B 5/022; B32B 2250/02; B32B 2250/03; B32B 2250/20; B32B 2250/40; B32B 2262/0253; B32B 2262/0276; B32B 2262/144; B32B 2307/31; B32B 2307/54; B32B 2307/558; B32B 2307/582; B32B 2307/718; B32B 2307/7242; B32B 2307/7265; B32B 2307/732; B32B 2439/80; B32B 2262/0284; B32B 2307/581; B32B 2307/5825; B32B 2307/724; B32B 2307/748; B32B 7/06; B32B 5/265; D10B 2321/022; D10B 2331/04; D10B 2401/04; D10B 2401/06; D10B 2509/00; D04H 3/16; B65D 65/40
USPC ........................ 442/340, 351, 381, 382, 401
See application file for complete search history.

(56) References Cited

U.S. PATENT DOCUMENTS

| | | |
|---|---|---|
| 6,936,554 B1 | 8/2005 | Singer et al. |
| 2003/0219585 A1 | 11/2003 | Yamanaka et al. |
| 2006/0292954 A1 | 12/2006 | Suzuka et al. |
| 2012/0227362 A1 | 9/2012 | Lima |
| 2013/0269294 A1 | 10/2013 | Benton et al. |
| 2015/0171397 A1 | 6/2015 | Yamada et al. |
| 2015/0239204 A1 | 8/2015 | Takebe et al. |
| 2017/0314174 A1 | 11/2017 | Ichikawa et al. |

(Continued)

FOREIGN PATENT DOCUMENTS

| | | |
|---|---|---|
| EP | 2425965 A1 | 3/2012 |
| JP | H05-329971 A | 12/1993 |

(Continued)

OTHER PUBLICATIONS

International Search Report issued in corresponding International Patent Application No. PCT/JP2020/012502 dated Jun. 9, 2020.

(Continued)

*Primary Examiner* — Matthew D Matzek
(74) *Attorney, Agent, or Firm* — Morgan, Lewis & Bockius LLP

(57) ABSTRACT

The present disclosure provides: a non-woven fabric for a sterilization packaging material, the non-woven fabric being capable of being compatible with all sterilization treatment methods and maintaining a sterile state in the interior without breaking even in a variety of environments in which the non-woven fabric can be assumed to be used as a sterilization packaging material; and a non-woven fabric for a sterilization packaging material, the non-woven fabric achieving both easy-peel properties that enable easy handling without breakage and barrier properties for retaining the sterile state in the interior.

9 Claims, No Drawings

(56) References Cited

U.S. PATENT DOCUMENTS

| | | | |
|---|---|---|---|
| 2018/0099483 A1 | 4/2018 | Jackson | |
| 2019/0071228 A1* | 3/2019 | Kusakabe | D04H 3/16 |
| 2019/0210754 A1* | 7/2019 | Venugopal | B65B 11/48 |

FOREIGN PATENT DOCUMENTS

| | | | | |
|---|---|---|---|---|
| JP | H07-238449 A | 9/1995 | | |
| JP | 2002-200707 A | 7/2002 | | |
| JP | 2004-029304 A | 1/2004 | | |
| JP | 2009-022924 A | 2/2009 | | |
| JP | 2010-196188 A | 9/2010 | | |
| JP | 2014-237478 A | 12/2014 | | |
| JP | 2015-074838 A | 4/2015 | | |
| JP | 2017-197890 A | 11/2017 | | |
| JP | 2018-003238 A | 1/2018 | | |
| JP | 2018-145544 A | 9/2018 | | |
| JP | 2019-206351 A | 12/2019 | | |
| TW | 201420831 A | 6/2014 | | |
| WO | 2004/094136 A1 | 11/2004 | | |
| WO | 2013/151134 A1 | 10/2013 | | |
| WO | 2014/042253 A1 | 3/2014 | | |
| WO | 2016/068312 A1 | 5/2016 | | |
| WO | WO-2016159266 A1 * | 10/2016 | | B01D 39/16 |
| WO | 2017/146050 A1 | 8/2017 | | |
| WO | WO-2017146050 A1 * | 8/2017 | | A61B 50/30 |

OTHER PUBLICATIONS

International Preliminary Report on Patentability and Written Opinion issued in corresponding International Patent Application No. PCT/JP2020/012502 dated Oct. 7, 2021.

Supplementary European Search Report issued in corresponding European Patent Application No. 20777038.9 dated Mar. 29, 2022.

* cited by examiner

NONWOVEN FABRIC FOR STERILIZATION PACKAGING MATERIAL

FIELD

The present invention relates to a nonwoven fabric for a sterilization packaging material, to be used for sterilization of medical equipment.

BACKGROUND

The use of medical equipment after sterilization processing to prevent infectious disease is already known, and equipment that is subjected to such processing includes, specifically, scalpels, pincettes, scissors and the like. High-temperature, high-pressure vapor methods and ethylene oxide gas methods are used as sterilization processing methods, and sterilizing packaging materials suitable for such methods are used. The sterilizing packaging material must have satisfactory gas permeability for sterilization processing and high barrier properties to maintain a sterile state, as well as easy-peeling property to allow removal with appropriate force during opening. An easy-peeling property is particularly important because excessively high peel strength can potentially lead to rupture of the packaging material and contamination of medical equipment due to generated paper dust and lint.

Moreover, with development of more advanced medical technologies in recent years, and steady maintenance of medical environments in countries throughout the world, there is increasing demand for even higher levels for a wide variety of performance of packaging materials, with increased strength being an example. Many types of medical tools are sharp, and some are large and heavy pieces of equipment. Such packaging materials must be resistant to rupture until just prior to use, and require nonwoven fabric strength including tear strength and puncture strength.

Packaging materials for sterilization generally employ nonwoven fabrics or films that have pulp or synthetic fiber resins such as polyethylene as the starting materials, but in recent years combinations of nonwoven fabrics and transparent resin films are being used, which are bonded together in the form of bags to allow interior visibility.

For example, PTL 1 listed below describes a nonwoven fabric produced by a flash-spinning method using a polyethylene resin, as a fibrous sheet to be used in the medical field. In flash-spinning, the yarn diameter is non-uniform, while production is not possible with an average fiber diameter of 2 μm or smaller, the basis weight dispersibility of the obtained nonwoven fabric is unsatisfactory and the use of a solvent or the like is necessary, all of which factors make it impractical in terms of safety as well.

PTL 2 listed below describes a pulp-type sterilized sheet wherein a sterilized sheet and a synthetic resin film are laminated to obtain heat sealability. Usually, however, when a pulp sterilized sheet is used as a packaging material for sterilization, paper dust flies off during working because the fibers are not connected one to another unlike in a long fiber nonwoven fabric, and this has been a crucial problem for medical equipment. In addition, pulp sterilized sheets are extremely fragile and unacceptable as packaging materials in environments where alcohol or water are frequently used.

PTL 3 listed below describes a layered nonwoven fabric using a melt-blown nonwoven fabric, wherein heat sealability is obtained by forming it from a thermoplastic resin. One method for obtaining a satisfactory peel property is bonding together the fibers by calendering. However, nothing is mentioned in the publication in regard to obtaining both heat sealing strength (peel strength) and a barrier property.

In regard to strength, PTL 4 listed below provides an example of improving strength for a commonly used sterilized sheet by using characteristic starting materials. This publication reports that a sterilized sheet with puncture strength after sterilization processing while maintaining high gas permeability can be obtained by impregnating a resin into a base sheet composed of pulp having a mass ratio of 5/5 to 7/3 for conifer pulp (N material) and broadleaf tree pulp (L material) and a beating degree of 25° SR-40 as the Schopper freeness, and forming a heat sealing agent layer on one side, but since adequate puncture strength has not yet been obtained, its range of usability is considered to be limited.

CITATION LIST

Patent Literature

[PTL 1] Japanese Unexamined Patent Publication No. 2014-237478
[PTL 2] Japanese Unexamined Patent Publication HEI No. 7-238449
[PTL 3] International Patent Publication No. 2017/146050
[PTL 4] Japanese Unexamined Patent Publication No. 2004-29304

SUMMARY

Technical Problem

In light of the problems of the prior art mentioned above, it is an object of the present invention to provide a nonwoven fabric for a sterilization packaging material having both an easy-peeling property that allows handling to be facilitated without rupture, and a barrier property that maintains the sterile state inside the packaging material, and to provide a nonwoven fabric for a sterilization packaging material that can be applied to various sterilization processing methods without rupture in a variety of possible environments for a packaging material for sterilization, and that can maintain the interior sterile state.

Solution to Problem

As a result of ardent research conducted with the aim of achieving the object stated above, the present inventors have completed this invention upon finding that both an easy-peeling property and a barrier property can be obtained for a nonwoven fabric by lowering the void percentage of the surface layer that exhibits the easy-peeling property and increasing the number of threads in the layer that exhibits the barrier property, and that a nonwoven fabric with high strength can be obtained if it has a specific fiber structure and a formation index in a specified range.

Specifically, the present invention is as follows.

[1] A nonwoven fabric for a sterilization packaging material having a fiber layer (I) with a void percentage of 30% to 60%, as a surface layer heat seal surface, and a fiber layer (II) with a fiber specific surface area of 1.0 $m^2/g$ to 10 $m^2/g$ and a 1 cm-equivalent thread count of between 800 and 1,000,000 per 1 mg, as a barrier layer, wherein the fiber layer (I) and the fiber layer (II) are layered.

[2] The nonwoven fabric for a sterilization packaging material according to [1] above, wherein the heat seal strength of the fiber layer (I) is 5 N/25 mm to 25 N/25 mm.

[3] The nonwoven fabric for a sterilization packaging material according to [1] or [2] above, wherein the fibers composing the fiber layer (II) are polypropylene fibers.

[4] The nonwoven fabric for a sterilization packaging material according to any one of [1] to [3] above, wherein the fiber diameters of the fibers composing the fiber layer (I) are 5 μm to 30 μm, and the fiber diameters of the fibers composing the fiber layer (II) are 0.05 μm to 5 μm.

[5] The nonwoven fabric for a sterilization packaging material according to any one of [1] to [4] above, wherein the fiber diameters of the fibers composing the fiber layer (I) are 5 μm to 20 μm.

[6] The nonwoven fabric for a sterilization packaging material according to any one of [1] to [5] above, which includes at least one layer of the fiber layer (I) and at least two layers of the fiber layer (II).

[7] A nonwoven fabric for a sterilization packaging material, wherein the weight-average fiber diameter is 3 μm to 30 μm and the formation coefficient is 1.0 to 5.0.

[8] The nonwoven fabric for a sterilization packaging material according to [7] above, which is composed of long fibers.

[9] The nonwoven fabric for a sterilization packaging material according to [7] or [8] above, wherein the puncture strength is 50 N to 500 N.

[10] The nonwoven fabric for a sterilization packaging material according to any one of [7] to [9] above, wherein the tear strength is 0.5 N to 20 N in both the MD direction and CD direction.

[11] The nonwoven fabric for a sterilization packaging material according to any one of [7] to [10] above, wherein the tensile strength is 30 N/25 mm to 300 N/25 mm in both the MD direction and CD direction, and the ratio of tensile strength in the MD direction/tensile strength in the CD direction is 1.2 to 5.0.

[12] The nonwoven fabric for a sterilization packaging material according to any one of [7] to [11] above, which has a fiber layer (A) composed of continuous long fibers with an average fiber diameter of 5 μm to 30 μm as the surface layer heat seal surface, and a fiber layer (B) composed of ultrafine fibers with an average fiber diameter of 0.1 μm to 4 μm as the barrier layer, wherein the fiber layer (A) and fiber layer (B) are layered.

[13] The nonwoven fabric for a sterilization packaging material according to [12] above, wherein a fiber layer (B) is present as an intermediate layer between two fiber layers (A).

[14] The nonwoven fabric for a sterilization packaging material according to [12] or [13] above, wherein the fiber layer (B) is composed of a melt-blown nonwoven fabric.

[15] The nonwoven fabric for a sterilization packaging material according to any one of [7] to [14] above, which is composed of polyester fibers.

[16] The nonwoven fabric for a sterilization packaging material according to any one of [7] to [15] above, wherein the water pressure resistance is 10 cm $H_2O$ or greater.

[17] The nonwoven fabric for a sterilization packaging material according to any one of [7] to [16] above, wherein the average flow pore size is 0.5 μm to 20 μm.

[18] The nonwoven fabric for a sterilization packaging material according to any one of [7] to [17] above, wherein the atmospheric dust trapping efficiency is 90% or greater.

[19] The nonwoven fabric for a sterilization packaging material according to any one of [1] to [18] above, wherein the total basis weight is 20 g/m² to 100 g/m².

[20] The nonwoven fabric for a sterilization packaging material according to any one of [1] to [19] above, wherein the gas permeability in a Gurley gas permeability test is 0.1 sec/100 mL to 100 sec/100 mL.

[21] The nonwoven fabric for a sterilization packaging material according to any one of [1] to [20] above, wherein the gas permeability in a Gurley gas permeability test is 0.1 sec/100 mL to 20 sec/100 mL.

[22] The nonwoven fabric for a sterilization packaging material according to any one of [1] to [21] above, wherein the total thickness is 50 μm to 300 μm.

[23] The nonwoven fabric for a sterilization packaging material according to any one of [1] to [22] above, wherein the surface coverage is 40% to 99%.

Advantageous Effects of Invention

According to a first aspect of the invention it is possible to provide a nonwoven fabric for a sterilization packaging material exhibiting both an easy-peeling property and a barrier property, by layering a fiber layer with low porosity and a fiber layer with a high specific surface area and a high thread count. According to a second aspect of the invention, by having the specified fiber structure and high strength, adaptability to various sterilization processing methods is provided and it is possible to maintain the interior sterile state of the packaging material at a high level.

DESCRIPTION OF EMBODIMENTS

Embodiments of the invention will now be described in detail.

The nonwoven fabric for a sterilization packaging material according to a first embodiment of the invention has a fiber layer (I) with a void percentage of 30% to 60%, as a surface layer heat seal surface, and a fiber layer (II) with a fiber specific surface area of 1.0 m²/g to 10 m²/g and a 1 cm-equivalent thread count of 800 or greater per 1 mg, as a barrier layer, and the fiber layer (I) and the fiber layer (II) are layered.

Throughout the present specification, the term "fiber layer" means a layer composed of fibers having essentially the same fiber diameter, and the term "nonwoven fabric" means a fiber layer as a single cloth, or a cloth of two or more fiber layers combined by layering.

In the nonwoven fabric for a sterilization packaging material according to the first embodiment of the invention, it is important to lower the void percentage of the fiber layer (I) of the surface layer that provides heat sealing, to 30% to 60%, preferably 45% to 55% and more preferably 40% to 50%. If the void percentage is 60% or lower it will be possible to reduce the gaps between the threads and to cause the fused components of the film to be blocked at the surface layer during heat sealing to prevent their deeper infiltration, making it possible to ensure an easy-peeling property that allows peeling with appropriate force. One indicator of the easy-peeling property is the peel strength when the film is peeled, with a lower peel strength being preferred from the viewpoint of the easy-peeling property, and a peel strength of 27 cN/25 mm or lower can be easily peeled by human force and is considered to be an easy-peeling property, although 25 cN/25 mm or lower is more preferred. If the void percentage is 30% or greater the gas permeability of the nonwoven fabric will be ensured, allowing efficient sterilization to the interior during sterilization processing.

In order to exhibit a high barrier property with the fiber layer (II) of the nonwoven fabric for a sterilization packaging material according to the first embodiment of the invention, the specific surface area of the fibers is 1.0 m²/g to 10 m²/g, preferably 1.2 m²/g to 8 m²/g and more preferably 1.5 m²/g to 5 m²/g. A specific surface area of 1.0 m²/g or greater can adequately ensure thread surfaces that will trap bacteria. If the specific surface area is 10 m²/g or lower then gas permeability will be maintained and high sterilization processing efficiency will be ensured.

In the fiber layer (II) of the nonwoven fabric for a sterilization packaging material according to the first embodiment of the invention, the 1 cm-equivalent thread count per 1 mg is between 800 and 1,000,000, preferably 1,000 to 800,000 and more preferably 10,000 to 500,000.

With 800 or greater the contact frequency between bacteria and threads will increase, thus leading to increased trapping efficiency. Having up to 1,000,000 threads will provide a minimum fixed level of gas permeability, allowing both trapping efficiency and gas permeability to be obtained.

The fiber layer (I) of the nonwoven fabric for a sterilization packaging material according to the first embodiment of the invention is disposed on the surface layer as the heat seal surface, and the heat seal strength is 5 N/25 mm to 25 N/25 mm, preferably 8 N/25 mm to 23 N/25 mm and more preferably 10 N/25 mm to 20 N/25 mm. If the heat seal strength is 5 N/25 mm or greater it will be possible to prevent unwanted rupture during handling, thus ensuring reliability of the sterile state. If it is 25 N/25 mm or lower then opening will be possible without generating lint or paper dust, thus helping to avoid contamination of medical equipment.

The fibers composing the fiber layer (II) of the nonwoven fabric for a sterilization packaging material according to the first embodiment of the invention are preferably polypropylene fibers. Polypropylene has heat resistance against steam sterilization while also being a resin with low density, and it therefore has a high 1 cm-equivalent thread count per 1 mg and tends to exhibit a high barrier property. Polypropylene also has high heat resistance among low-density resins, which allows sterilization processing without heat shrinkage even in sterilization methods that employ heating, such as steam sterilization. Polypropylene is therefore a preferred material that exhibits both low density and heat resistance.

The total basis weight of the nonwoven fabric for a sterilization packaging material according to the first and second embodiments of the invention is 20 g/m² to 100 g/m², preferably 30 g/m² to 90 g/m² and more preferably 40 g/m² to 80 g/m². If the total basis weight is 20 g/m² or greater the strength will be sufficient and rupture during handling can be prevented. If it is 100 g/m² or lower, adequate gas permeability necessary for sterilization processing can be obtained.

The air permeability of the nonwoven fabric for a sterilization packaging material according to the first and second embodiments of the invention is represented by a time of preferably 0.1 seconds to 100 sec/100 mL for passage through a 100 mL air layered nonwoven fabric in a Gurley air permeability test. If it is 0.1 sec/100 mL or greater, the average flow pore size will be on the microlevel, making it possible to ensure a bacterial barrier property to allow use as a packaging material for sterilization. If it is 100 sec/100 mL or lower, on the other hand, permeability of gas or vapor can be ensured, to allow sterilization processing of interior medical equipment. For this reason the air permeability is more preferably 0.2 sec/100 mL to 80 sec/100 mL and even more preferably 0.5 sec/100 mL to 20 sec/100 mL.

The fiber diameters of the fibers composing the fiber layer (I) of the nonwoven fabric for a sterilization packaging material according to the first embodiment of the invention are preferably 5 μm to 20 μm, more preferably 8 μm to 18 μm and even more preferably 10 μm to 15 μm. If they are 5 μm or greater then it will be possible to obtain sufficient monofilament strength. If they are 20 μm or lower, on the other hand, gaps between the surface layers can be reduced, infiltration of fused components of the film can be inhibited and an easy peel property can be obtained.

The total thickness of the nonwoven fabric for a sterilization packaging material according to the first and second embodiments of the invention is preferably 50 μm to 500 μm, more preferably 70 μm to 400 μm and even more preferably 100 μm to 300 μm. If the total thickness is 50 μm or greater it will be possible to obtain sufficient mechanical strength for the nonwoven fabric. If it is 500 μm or lower, on the other hand, it will be possible to avoid impairing the nonwoven fabric gas permeability.

While the method for producing each of the fiber layers is not restricted, the method for fiber layer (I) is preferably a spunbond method, a dry method or a wet method, and more preferably a spunbond method for good productivity. The method for producing the fiber layer (II) is preferably a dry method or wet method using ultrafine fibers, or it may be an electrospinning method or melt-blown method. A melt-blown method is more preferred as it will allow a superfine nonwoven fabric to be formed more easily and compactly.

The method for layering and integrating the fiber layer (I) and fiber layer (II) is preferably one that includes heat bonding. The thermal bonding method by heat bonding may be calendering or integration with high-temperature hot air (air-through system). Heat calendering is particularly preferred for low porosity of the fiber layer (I) while maintaining a high void percentage for the fiber layer (II).

The nonwoven fabric for a sterilization packaging material according to this embodiment can have both the easy-peeling property and barrier property satisfied by layering the fiber layer (I) with low porosity and the fiber layer (II) with a high 1 cm-equivalent thread count per 1 mg.

When the method for layering and integrating the fiber layer (I) and fiber layer (II) is by heat bonding, a dense surface structure with the fibers firmly bonded to each other and with few gaps is necessary in order to exhibit the easy-peeling property of the fiber layer (I), and processing under high temperature and/or high pressure conditions is preferred. In order to exhibit the high barrier property of the fiber layer (II), on the other hand, it is preferred to maintain the internal fiber structure of the nonwoven fabric and prevent fusion between the threads, and to increase the thread surface area, and therefore processing under low temperature and/or low pressure conditions is preferred. In order to satisfy both the easy-peeling property and barrier property, therefore, preferably the temperature, pressure and heating time are controlled, instead of common heat bonding processing. With heat calendering, for example, a low-hardness roll may be used to lower the contact bonding energy on the fiber layer (II) while uniformly and sufficiently contact bonding the fiber layer (I). The roll hardness is preferably 50 to 90 as the type A durometer hardness, and the pressure is preferably 5 kg/cm to 30 kg/cm as the linear pressure. The type A durometer hardness is the value measured according to JISK2653-3. The fiber layer (I) thus has a uniform dense structure with few gaps, while the fiber layer (II) has a structure with sufficiently reduced structural failure by heat calendering and no fusion between threads, allowing both an easy-peeling property and barrier property to be exhibited.

The nonwoven fabric for a sterilization packaging material according to the second embodiment of the invention has a weight-average fiber diameter of 3 µm to 30 µm and a formation coefficient of 1.0 to 5.0.

The weight-average fiber diameter is a parameter representing the network structure of the fibers present in the nonwoven fabric material. Specifically, it represents the network structure of the fibers for the nonwoven fabric as a whole, from the viewpoint of the average fiber diameter.

A narrower weight-average fiber diameter corresponds to more entanglement points between the fibers and a greater number of bonding points between the fibers. The base fabric strength (tensile strength, puncture strength and tear strength) of the nonwoven fabric material is governed by the number of fiber bonding points (number of entanglement points) in the network structure and the strength of the individual bonding points, with a greater number of bonding points between fibers associated with a more reinforced continuous fiber structure and resistance to fracture. For this reason, a weight-average fiber diameter of 30 µm or lower increases the number of fiber entanglement points allowing an intricate network structure to be obtained for the nonwoven fabric internal structure, and increases the base fabric strength of the nonwoven fabric as it exhibits the adhesive force of the entanglement points, allowing it to be used as a packaging material for sterilization that does not rupture even against sharp medical equipment such as scalpels and scissors. If the weight-average fiber diameter is 3 µm or greater, on the other hand, it will be possible to maintain a minimum level of gas permeability, while the permeability for vapor and gas will be excellent, allowing sterilization processing of the contents. The weight-average fiber diameter is preferably 4 µm to 25 µm and more preferably 5 µm to 20 µm. The weight-average fiber diameter can be controlled by the diameters of the fibers composing the nonwoven fabric, and by the basis weight. Control of the fiber diameter requires the discharge conditions, attraction conditions and cooling conditions to be set within suitable ranges, though this is not limitative. For example, the single-hole throughput is preferably 0.01 g/(min hole) to 1.50 g/(min hole) and the attraction air speed is preferably 500 Nm$^3$/hr/m to 2000 Nm$^3$/hr/m. The fiber diameter and basis weight are preferably balanced with the other properties required for a packaging material for sterilization in addition to strength, such as bacterial trapping properties and transparency.

The nonwoven fabric for a sterilization packaging material according to the second embodiment of the invention has a nonwoven fabric formation coefficient of 1.0 to 5.0. The formation coefficient is a parameter representing the basis weight variation of the nonwoven fabric. The basis weight variation is a factor generally linked to variation in strength, with a lower basis weight variation (a lower formation coefficient) associated with lower strength variation of the nonwoven fabric. When a nonwoven fabric is torn, the tearing occurs at the sections of low strength (of low basis weight), and it is therefore necessary to inhibit variation in strength in order to achieve high strength, similar to an effect of improving latent strength. For this reason, a formation coefficient of 5.0 or lower can inhibit variation in strength by basis weight variation of the nonwoven fabric. From the viewpoint of the bacterial barrier property as well, it can avoid large hole (pinhole) formation due to basis weight variation, allowing a high sterile state to be maintained. The nonwoven fabric formation coefficient is preferably 4.5 or lower and more preferably 4.0 or lower. The means for controlling the formation coefficient may be limiting the single-hole throughput to be in a suitable range.

The nonwoven fabric for a sterilization packaging material according to the second embodiment of the invention is preferably composed of continuous long fibers. Long fibers are fibers with lengths of 15 mm and longer. Since continuous long fibers are more continuous filaments than staple fibers, they have higher monofilament strength, and as a result produce higher fabric strength and allow the production steps to be stabilized.

In the nonwoven fabric for a sterilization packaging material according to the second embodiment of the invention, the puncture strength is preferably 50 N to 500 N. A puncture strength of 500 N or lower will be sufficiently resistant against cutting instruments such as cutters, while also providing satisfactory processing suitability for slitting. If the puncture strength is 50 N or higher, on the other hand, rupturing will not occur with sharp medical equipment such as scalpels or scissors. The puncture strength is more preferably 70 N to 450 N and even more preferably 100 N to 400 N.

In the packaging material for sterilization according to the second embodiment of the invention, the tearing strength is preferably 0.5 N to 20 N in both the MD direction (the machine direction, i.e. the direction of production of the nonwoven fabric web) and the CD direction (cross-machine direction). A tearing strength of 20 N or lower will allow cutting without problems using scissors, which is excellent from the viewpoint of practical use. If it is 0.5 N or higher, on the other hand, the form of packaging can be maintainable without tearing against external impact with sharp objects. The tearing strength is more preferably 0.7 N to 15 N and even more preferably 0.9 N to 10 N.

In the packaging material for sterilization according to the second embodiment of the invention, the tensile strength is preferably 30 N/25 mm to 300 N/25 mm in both the MD direction and the CD direction. If the tensile strength is 30 N/25 mm or greater then the material will be able to withstand tensile force during the processing steps of the production process. If it is 300 N/25 mm or lower, on the other hand, the sheet will be soft, facilitating packaging of medical equipment, and it will therefore be more manageable from the viewpoint of handling.

The tensile strength is more preferably 40 N/25 mm to 250 N/25 mm and even more preferably 50 N/25 mm to 200 N/25 mm.

In the nonwoven fabric for a sterilization packaging material according to the first and second embodiments of the invention, the Gakushin Abrasion fluff grade assessment indicating the surface strength is preferably grade 3.0 to 5.0. If it is grade 3.0 or higher, the packaging material will be handleable with medical gloves commonly used for medical procedures, and a clean environment can be maintained without generating fluff due to the protrusion of threads resulting from friction on the surface. Moreover, because of the strong adhesion between threads on the surface, it is also possible to avoid flying of paper dust caused by fluff during peeling of pouch products, and to thus obtain a clean peeling property. The fluff grade assessment is more preferably grade 3.5 or greater and even more preferably grade 4.0 or greater.

The packaging material for sterilization according to the second embodiment of the invention preferably has a layered structure of nonwoven fabrics. If it has a layered structure, then it will be possible to design unique layers satisfying a high level of different required properties for higher performance. The nonwoven fabric for a sterilization packaging material according to the second embodiment of the invention preferably has a fiber layer (A) composed of continuous long fibers with an average fiber diameter of 5 µm to 30 µm as the surface layer heat seal surface, and a fiber layer (B) composed of ultrafine fibers with an average fiber diameter of 0.1 µm to 4 µm as the barrier layer, and the fiber layer (A) and fiber layer (B) are layered.

If the fiber diameter of the fiber layer (A) is 30 µm or smaller then it will be possible to obtain uniform interfiber distances, thereby allowing a compact, homogeneous layered nonwoven fabric to be obtained, and when the fiber layer (A) and fiber layer (B) are layered in contact with each other, the ultrafine fibers composing the fiber layer (B) will infiltrate and be more uniformly disposed between the fibers composing the fiber layer (A). This can result in uniform pore diameters in the layered nonwoven fabric, reducing the size of the bubble point, which is the maximum pore diameter, and thus allowing a satisfactory bacterial barrier property to be exhibited. The fiber layer (B) may also consist of two or more layers, depending on the case. If the fiber diameters of the fibers composing the fiber layer (A) are 5 µm or greater, on the other hand, the monofilament strength will be increased, the layered nonwoven fabric will be able to exhibit sufficient tension and puncture strength, and the processability will also be stable.

The fiber diameters of the fibers composing the fiber layer (A) are more preferably 7 µm to 25 µm and even more preferably 9 µm to 20 µm.

If the fiber diameters of the fibers composing the fiber layer (B) are 4 µm or lower, the interfiber distances will be closer together, allowing micropore diameters to be obtained and allowing a satisfactory bacterial barrier property to be exhibited. From the viewpoint of gas permeability and bacterial barrier property, the fiber diameters of the fibers composing the fiber layer (B) are more preferably 0.3 µm to 3 µm and even more preferably 0.5 µm to 2.5 µm.

In order to more stably produce the nonwoven fabric for a sterilization packaging material according to the second embodiment of the invention, a three-layer layered nonwoven fabric is preferred in which a fiber layer (B) is present as an intermediate layer between two fiber layers (A). If both sides of the layered nonwoven fabric are the fiber layer (A), it will be possible to minimize napping and lint generation when external force has been applied to the nonwoven fabric surface during working, while during production, defects due to surface fluff can be minimized, a satisfactory peeling property may be expected, and a nonwoven fabric can be obtained that is satisfactory as a packaging material for sterilization.

While the method for producing each of the nonwoven fabric layers is not restricted, the method for forming the fiber layer (A) may be a spunbond method, a dry method or a wet method, and it is preferably a spunbond method for good productivity. The method for producing the fiber layer (B) may be a dry method or wet method using ultrafine fibers, or an electrospinning method or melt-blown method, but it is preferably a melt-blown method to allow easier formation of a compact superfine nonwoven fabric.

The method of layering and integrating the fiber layer (A) and fiber layer (B) is not particularly restricted. Specifically, the method may be thermal bonding such as calendering or integration with high-temperature hot air (an air-through system), or chemical bonding such as coating of an emulsified polyacrylate or polyurethane resin. Thermal bonding, in particular, can maintain the tensile strength and puncture strength and bending flexibility of the nonwoven fabric, and allows formation of a plurality of nonwoven fabric layers without using a binder, and it is therefore highly preferred for medical packaging materials because inclusion of impurities can be prevented. A particularly preferred thermal bonding method is calendering. Calendering is a method of contact bonding with a metal roll having embossed or textured irregularities, or a heated roll using a smooth flat roll. The surface pattern of a roll with surface irregularities is not particularly restricted so long as it allows the fibers to be bonded together. An easy-peeling property can be imparted by this process. The thermal bonding step may be carried out at a temperature of 50° C. to 120° C. lower than the melting point of the thermoplastic resin (preferably long fibers of a thermoplastic resin) and a linear pressure of 100 N/cm to 1000 N/cm. If the linear pressure in the thermal bonding step is 100 N/cm or higher it will be possible to obtain a sufficient degree of bonding between the fibers. If it is 1000 N/cm or lower it will be possible to control the apparent density and average flow pore size to suitable ranges, so that the necessary permeability for gas and vapor can be ensured. In a papermaking method it is sufficient to control the fiber diameters of staple fibers produced by a known method.

The fibers composing the nonwoven fabric for a sterilization packaging material according to the first and second embodiment of the invention are preferably composed of a thermoplastic synthetic resin. For example, it may comprise a polyolefin-based resin, polyester-based resin or polyphenylene sulfide-based resin, with specific examples including polyolefins such as high-pressure method low-density polyethylene, linear low-density polyethylene (LLDPE), high-density polyethylene, polypropylene (propylene homopolymer), polypropylene random copolymer, poly-1-butene, poly-4-methyl-1-pentene and ethylene/propylene random copolymers, which are homopolymers or copolymers of α-olefins such as ethylene, propylene, 1-butene, 1-hexane, 4-methyl-1-pentene or 1-octene, and polyesters (polyethylene terephthalate, polybutylene terephthalate or polyethylene naphthalate). Copolymers or mixtures composed mainly of these resins are also preferred. In particular, using a nonwoven fabric composed of a resin with a melting point of 140° C. or higher is suitable for sterilization processing that requires high-temperature conditions, such as steam sterilization. For this reason, it is preferably polypropylene-based and more preferably a polyester-based polymer. Using such synthetic resins will provide especially high heat resistance, and will allow higher temperature processing than in the prior art for high-pressure steam sterilization processing that is commonly used in hospitals, and can thus reduce processing time and allow more efficient sterilization processing.

Since the heat resistance is high, this allows a compact pore structure composed of ultrafine fibers to be maintained, and can effectively prevent infiltration of bacteria even after sterilization processing. These polymers are also resistant to degeneration even under electron beam irradiation, and can thus be applied in gas sterilization and electron beam sterilization that are employed outside of hospitals, making them useful as packaging materials for sterilization that are suited for a variety of treatment methods.

The water pressure resistance of the nonwoven fabric for a sterilization packaging material according to the second embodiment of the invention is preferably 10 cm $H_2O$ or higher. If the water pressure resistance is 10 cm $H_2O$ or higher then it will be possible to inhibit infiltration of bacteria-containing fluids into the package interior in medical environments with numerous wet spots, thus allowing an ideal sterile state to be maintained. For this reason, the water pressure resistance is more preferably 15 cm $H_2O$ or higher and even more preferably 20 cm $H_2O$ or higher.

The average flow pore size of the nonwoven fabric for a sterilization packaging material according to the second embodiment of the invention is preferably 0.5 μm to 20 μm. If the average flow pore size is 0.5 μm or higher, sufficient gaps will be formed between the fibers to ensure air permeability, and the effects of sterilization processing will therefore reach to the interior of the packaging material. If it is 20 μm or lower, on the other hand, it will be possible to physically trap bacteria, allowing the sterilized condition to be maintained. For this reason the average flow pore size is more preferably 0.8 μm to 15 μm and even more preferably 1.0 μm to 10 μm.

The atmospheric dust trapping efficiency of the nonwoven fabric for a sterilization packaging material according to the second embodiment of the invention is preferably 90% or greater. If the atmospheric dust trapping efficiency is 90% or greater then infiltration of bacteria into the package interior can be prevented, allowing a highly sterile state to be maintained. For this reason the atmospheric dust trapping efficiency is more preferably 92% or greater and even more preferably 95% or greater.

A packaging material for sterilization is generally a packaging material for sterilization with only gas permeability, as in the case of a nonwoven fabric, or it employs a combination of an gas-permeable base material and a non-gas-permeable base material such as a transparent film, and therefore heat sealability is often required for the base materials. The nonwoven fabric for a sterilization packaging material of this embodiment is composed of a thermoplastic resin and easily exhibits heat sealability. Particularly excellent heat seal strength is exhibited by employing a low-melting-point resin material or the like on one side. If heat sealability is exhibited, the layered nonwoven fabric can be used not only for packaging materials for sterilization, but also for thermocompression bond sewing for sewing of surgical gowns and the like.

The nonwoven fabric for a sterilization packaging material according to the first and second embodiments of the invention are preferably treated for water repellency and alcohol repellency. The method for water-repellent and alcohol-repellent treatment is not restricted. For example, the method used may be a coating method in which a water-repellent material is coated, or a gas treatment method in which the fiber surfaces are activated and surface-treated by a gas having a water-repellent or alcohol-repellent property. There are no restrictions on the type of material having a water-repellent or alcohol-repellent property, or the type of gas, and fluorine-based and silicon-based materials may be mentioned.

The surface coverage of the nonwoven fabric for a sterilization packaging material according to the first and second embodiments of the invention is preferably 40% to 99%. The term "surface coverage" used here is the percentage of the surface of the nonwoven fabric that is covered by fibers, and the method for measuring it will be described in detail below. If the surface coverage is 40% or greater, it will be possible to prevent penetration of fused components through the gaps in the nonwoven fabric surface when the film is heat sealed to the nonwoven fabric, to prevent excessive contact bonding of the seal, and to inhibit generation of lint when the film is peeled and opened. This can provide a satisfactory easy-peeling property and clean-peeling property. The easy-peeling property is an indicator of the peel strength, with a value of 27 cN/25 mm or lower considered to be an easy-peeling property, and 25 cN/25 mm or lower being more preferred. A clean-peeling property indicates lack of generated waste or lint, napping, or tearing of the base material such as the nonwoven fabric, when it is peeled. It also denotes reduced strike-through of ink when indicators of product information or sterilization processing confirmation are printed, allowing satisfactory printability to be obtained. A value of 99% or lower will allow the gas permeability of the nonwoven fabric to be ensured. The surface coverage is more preferably 50% to 95%.

The means for limiting the range of surface coverage is not restricted, and it may be making an irregular thread cross-section, such as a flat shape, or by increasing the homogeneity of thread dispersion, it being especially effective to increase the homogeneity of thread dispersion. The method for increasing the homogeneity of thread dispersion may be optimization of the production conditions for formation of the fibers, such as the spinning temperature, discharge throughput, fiber diameters, fiber shapes, spinneret shape, cooling conditions and state of electrification. Circular shapes are particularly preferred for the fiber shapes. A circular shape will be less likely to generate shaking by air flow during the steps from discharge from the spinneret to formation of the fabric, compared to irregularly-shaped threads, and will help reduce unevenness in the dispersibility of the threads due to thread contact, thus allowing the homogeneity of dispersion to be increased. The single-hole throughput is preferably 0.1 g/(min hole) to 1.8 g/(min hole). At 0.1 g/(min hole) or greater, discharge can be stabilized and continuous unevenness of the fibers can be reduced. At 1.8 g/(min hole) or less, contact between the fibers can be prevented and unevenness due to fusion can be reduced. The other conditions may be optimized calendering conditions, for example.

EXAMPLES

The present invention will now be described in greater detail by examples, with the understanding that the invention is not limited to these examples.
(1) Void Percentage The void percentage a (%) of the fiber layer was calculated by the following formula:

$$a = \{1 - (W/h)/\rho\} \times 100$$

where the basis weight of the layer is represented by W (g/m$^2$), the layer thickness is represented by h (μm) and the resin density is represented by ρ (g/cm$^3$).

The fiber layer thickness h used was the value at one location of the measured fiber layer in a photograph of a cross-section of the nonwoven fabric using a SEM apparatus (JSM-6510 by JEOL Corp.) with an acceleration voltage of 15 kV and a working distance of 21 mm.

The fiber layers were distinguished by comparing the average fiber diameter of each layer and defining the border of each fiber layer to be the portion where the average fiber diameter changed by 2 μm or greater.

The basis weight W of each layer was calculated by the following formula:

$$W = Wt \times A/At$$

where the total basis weight of the layered nonwoven fabric is represented by Wt (g/m$^2$), the cross-sectional area of the fiber layer (I) during observation of the fiber layer cross-section is represented by A (μm²), and the total cross-sectional area of the layered nonwoven fabric is represented by At (μm²).

(2) Specific Surface Area

This was measured using an automatic specific surface area measuring apparatus (Gemini 2360 by Shimadzu Corp.). The nonwoven fabric was rolled into a cylindrical shape and inserted into a specific surface area measuring cell. The loaded sample weight at this time is preferably about 0.20 to 0.60 g. The sample-loaded cell was dried for 30 minutes under conditions of 60° C., and cooled for 10 minutes. Next, the cell was set in the specific surface area measuring apparatus, and with nitrogen gas adsorption onto the sample surface, the following BET formula:

$$P/\{V(P0-P)\} = 1/(Vm \times C) + \{(C-1)/(Vm \times C)\}(P/P0)$$

{where P0: saturated water vapor pressure (Pa), V: nitrogen adsorption (mg/g), Vm: monolayer adsorption (mg/g), C: adsorption heat-related parameter (−)<0}
was applied to calculate the specific surface area.

The specific surface area St (m²/g) of the entire layered nonwoven fabric measured by the method described above is represented by the following formula using the specific surface area $S_I$ (m²/g) of the fiber layer (I) and the specific surface area $S_{II}$ (m²/g) of the fiber layer (II):

$$St = S_I \times W_I/Wt + S_{II} \times S_{II}/Wt$$

{where Wt represents the total basis weight of the layered nonwoven fabric (m/g), and $W_I$ and $W_{II}$ represent the basis weights (m²/g) of the fiber layer (I) and fiber layer (II), respectively}.

The specific surface area $S_I$ and $S_{II}$ are inversely proportional to the fiber diameters $d_I$ and $d_{II}$, respectively. Therefore when $d_I$ is sufficiently large with respect to $d_{II}$, $S_I$ is considered to be sufficiently smaller than $S_{II}$, allowing simplification to the following formula:

$$St \approx S_{II} \times W_{II}/Wt$$

$S_{II}$ was then calculated by the following formula:

$$S_{II} = St \times Wt/W_{II}$$

(3) Heat Seal Strength (Peel Strength)

The heat seal strength after heat sealing at an appropriate temperature was measured by the following method, according to JIS L 1086. Five samples are prepared, each being a 10 cm-long, 2.5 cm-wide sample strip with a film of the same dimensions having polypropylene as the sealant component attached to the fiber layer (I) and heat sealed at a section 2 cm from the end, parallel to the cross-machine direction of the sample strip. The heat sealing is carried out using a hot press machine having an upper and lower pair of pressure welding bars (1 cm wide, 30 cm long), for 1 second at a pressure of 0.5 MPa. Using a benchtop precision universal testing machine (Model AGS-1000D by Shimadzu Corp.), the sample is set so that the bonded section is at the center of a chuck with a grip spacing of 7 cm and peeled at a pull rate of 10 cm/min, and the peak strength exhibited during peeling is recorded as the peel strength. A peel strength of 27 cN/25 mm or lower is condition to be an easy-peeling property. The sample is considered to have a clean-peeling property if there is a lack of generated waste or lint, napping, or tearing when it is peeled.

(4) 1 cm-Equivalent Thread Count Per 1 mg

The 1 cm-equivalent thread count n (cm/mg) per 1 mg was calculated by the following formula:

$$n = 1/\{\rho \times \pi \times (d/2 \times 10^{-4})^2\}$$

where the resin density is represented by ρ (g/cm³) and the fiber diameter is represented by d (μm).

The fiber diameter d was measured using an SEM apparatus (JSM-6510, product of JEOL Corp.) for photography under conditions with an acceleration voltage of 15 kV and a working distance of 21 mm, and the average value for 100 fibers was recorded.

(5) Atmospheric Dust Trapping Efficiency

Surrounding air passing through the nonwoven fabric was trapped, with a measurement area of 78.5 cm² (diameter: 10 cm) and a wind speed of 23.0 L/min, the number of particles (dust) with particle sizes of 1 μm or greater (effective diameter assuming spherical particles) in the trapped air was measured with a particle counter (KC-01D1 by Rion Co., Ltd., calibrated with polystyrene particles), and calculation was performed by the following formula:

Atmospheric dust trapping efficiency (%) =

$\{1 - (\text{downstream particle count}/\text{upstream particle count})\} \times 100$.

The particle diameter is calculated automatically by the particle counter. A higher level of atmospheric dust trapping efficiency is preferred.

(6) Gurley Gas Permeability (s/100 mL)

A Gurley densometer ("B" type by Yasuda Seiki Seisakusho Co., Ltd.) was used for measurement of the permeation time for 100 ml of air (units: s/100 mL), at room temperature. Measurement was conducted at 5 points at different locations of each nonwoven fabric sample, and the average value was recorded as the gas permeability.

(7) Basis Weight (g/m²)

Following the method of JIS L-1906, using a 20 cm length×25 cm width test piece, a total of nine locations were sampled, at three evenly spaced locations in the sample width direction and three evenly spaced locations in the direction of flow, the masses were measured, and the average value was converted to mass per unit area.

(8) Total Thickness (μm)

Following the method of JIS L-1906, the thickness was measured at 10 locations at equal spacings in the cross-machine direction, and the average value was determined.

(9) Measurement of Average Fiber Diameter and Weight-Average Fiber Diameter (μm)

A 1 cm-square test piece was cut out from each sample (nonwoven fabric) in a 20 cm-wide region, avoiding 10 cm from each end. The fiber diameters were measured at 30 points on each test piece using a microscope, and the average of the measured values (rounded to the second decimal point) was calculated as the average fiber diameter of the fibers composing the sample. For single layers, the average fiber diameter was also used as the weight-average fiber diameter. For layered structures, the average fiber diameter of each layer was measured and the fiber diameter calculated based on weight ratio (using the following formula) was recorded as the weight-average fiber diameter.

$$Dw = \sum Wi \cdot Di = \sum \{(Ni \cdot Di^2)/(Ni \cdot Di)\}$$

{In the formula, Wi=weight percentage of fiber diameter Di=Ni·Di/ΣNi·Di, and Ni is the number of fibers with fiber diameter Di.}

(10) Formation Coefficient

This is measured using a formation tester (FMT-MIII). A 20×30 cm test piece is sampled and placed on a diffuser panel, and light is irradiated from below the sample with a low-voltage direct tungsten current (6 V, 30 W). A transmission image taken with a CCD camera in a range of 18×25 cm is decomposed into 128×128 pixels, the light intensity at each pixel is measured, and the transmittance is calculated. The coefficient of variation of formation is the value of the standard deviation ($\sigma$) of transmittance for each small site (5 mm×5 mm) of the measuring sample divided by the mean transmittance (E) (see formula below), and it is the clearest indicator of variation in the small unit basis weight, with a smaller value indicating higher homogeneity.

$$\text{Formation coefficient of variation} = \sigma/E \times 100$$

(11) Tensile Strength (N/25 mm)

Following the method of JIS 8113, 10 cm on each end of the nonwoven fabric was removed, a 25 mm width×200 mm length test piece was gripped and anchored with an chuck distance of 100 mm, and measurement was performed at a cross head speed of 20 mm/min. Five samples were taken from every 1 m of nonwoven fabric width. A load was applied until the test piece fractured, and the average value of the strength of the test piece at maximum load in the machine direction (MD) and the cross-machine direction (CD) was calculated.

(12) Puncture Strength (N)

A needle with a diameter of φ25 mm and a tip radius of 12.5 mm was mounted in a benchtop precision universal testing machine (Model AGS-1000D by Shimadzu Corp.), and a puncture test was conducted at a temperature of 23±2° C. and a needle traveling speed of 50 mm/min. Measurement was conducted at 5 points at different locations of each nonwoven fabric sample, and the average value was recorded as the puncture strength.

(13) Tear Strength (N)

Following the method of JIS L 1085 5·5C and the pendulum method, one test piece with a size of 65 mm length× 100 mm width was taken in the MD direction and CD direction per 20 cm width, except for 10 cm at both ends of the nonwoven fabric sample, and was measured using an Elemendorf tearing tester. The average value of the measurements was calculated (and rounded to one decimal point). The measurement data in the MD direction are the values for the nonwoven fabric tom in the MD direction.

(14) Average Flow Pore Size and Bubble Point (μm)

A Palm Porometer (Model CFP-1200AEX) by PMI Co. was used as the measuring apparatus. With this measuring apparatus, using a nonwoven fabric as the sample, the nonwoven fabric is immersed in a wetting liquid of known surface tension, pressure is applied to the nonwoven fabric while all of the pores of the nonwoven fabric are covered with a film of the wetting liquid, and the diameter of the pores is measured by calculation from the pressure at which the wetting liquid film breaks, and the surface tension of the wetting liquid. Using Silwick by PMI Co. as the wetting liquid, the nonwoven fabric was immersed in the wetting liquid and thoroughly deaerated, after which the pore diameter was calculated using the following formula:

$$d = C \cdot r/p$$

{where d (units: μm) is the pore diameter of the filter, r (units: N/m) is the surface tension of the wetting liquid, P (units: Pa) is the pressure at which the liquid film breaks at that pore diameter, and C is a constant determined by the wet tension and contact angle of the wetting liquid}. The flow rate upon continuous change of the pressure P applied to the filter immersed in the wetting liquid from low pressure to high pressure (wet flow rate, units: L/min) was measured. In this measuring method, the value of the wet flow rate at a given pressure P divided by the dry flow rate at the same pressure is called the cumulative filter flow rate (units: %). The flow rate of the liquid film broken by pressure where the cumulative filter flow rate was 50% was recorded as the average flow pore size. Also, since the initial pressure does not break the liquid film even at the largest pores, that flow rate is 0. As the pressure is increased, the liquid film on the largest pores begins to break, creating a flow, and that pore diameter is called the bubble point.

(15) Water Pressure Resistance (Cm $H_2O$)

A 15 cm-square test piece was sampled and measured according to JIS L 1092, and the water pressure resistance was calculated from the average of the measured values.

(16) Atmospheric Dust Trapping Efficiency (%)

The atmosphere was trapped before and after passing through a measuring device, with a measuring area of 78.5 $cm^2$ (diameter: 10 cm) and a wind speed of 23.0 L/min, 1 μm particles (dust) in the trapped air were measured using a particle counter (Rion Co., Ltd.), and calculation was performed by the following formula.

$$\text{Atmospheric dust trapping efficiency (\%)} = [1 - (\text{number of downstream particles}/\text{number of upstream particles})] \times 100$$

(17) Surface Coverage (%)

A 1 cm-square test piece was cut out from the sample and observed at 500× magnification, and the irregular structure of the surface was measured. The area S1 was measured at a location 0 μm to d μm from the outermost surface location in the depthwise direction, and the percentage with respect to the area S2 of the total visual field was calculated as the coverage factor P. The value of d is the average fiber diameter of the surface layer. The irregular structure of the surface was measured using a VR-3000 One-shot 3D Measuring Macroscope by Keyence Corp. as the measuring apparatus, the diameters of the fibers were measured at 30 points using a JSM-6510 by JEOL Corp., and the average of the measured values (rounded to the second decimal point)

was calculated to determine the average fiber diameter d of the fibers composing the sample. The following formula was used for the calculation.

$$\text{Coverage factor } P\ (\%) = S1/S2 \times 100$$

Examples 1 to 8

Using a polypropylene resin in a spunbond method, a long fiber group of filaments was extruded toward a moving collection net and spun at a spinning speed of 4500 m/min and a spinning temperature of 230° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder from a spinneret nozzle with a spinneret nozzle diameter of 0.22 mm. The PP resin melting temperature, spinning gas temperature and molten resin single-hole throughput in the extruder were appropriately selected for tow thinning of the thermoplastic resin. SB spun fibers similar to those described above were blown onto the MB nonwoven fabric to produce an SB-MB-SB layered nonwoven fabric. The obtained web was then subjected to calendering at a linear pressure of 10 kg/cm using a low-hardness roll with a type A durometer hardness of 70, and adjusted to the desired void percentage to obtain a packaging material for sterilization.

Examples 9 to 14

A web was layered by a melt-blown method directly onto a continuous long fiber nonwoven fabric fabricated by a spunbond method using a polyester resin, and a continuous long fiber nonwoven fabric fabricated by a spunbond method was further layered over this to produce an SB-MB-SB layered nonwoven fabric. The fiber amount in each layer was adjusted by the single-hole throughput and the line speed. Adjustment of the fiber diameter for each layer was made by changing the attraction air speed in the range of 500 to 2000 Nm³/hr/m. A calendar flat roll was also used for integration while the thickness and apparent density were adjusted to the desired thickness to obtain each nonwoven fabric. However, the dispersibility was varied for the desired type of formation by appropriately adjusting the discharge conditions (single-hole throughput) and equipment conditions (special dispersion apparatus or spinneret design) in the spunbond method.

Examples 15 to 20

Using a polypropylene resin in a spunbond method, a long fiber group of filaments was extruded toward a moving collection net and spun at a spinning speed of 4500 m/min and a spinning temperature of 230° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder. The PP resin melting temperature, spinning gas temperature and molten resin single-hole throughput in the extruder were appropriately selected for tow thinning of the thermoplastic resin. Fusion by contact between the fibers was inhibited by adjusting the hole pitch of the spinneret and the degree of stretching and flow of cooling air, thereby achieving homogeneous dispersion of the fibers. SB spinning fibers similar to those described above were then blown onto the MB nonwoven fabric to produce an SB-MB-SB layered nonwoven fabric. The obtained web was then subjected to flat calendering at a linear pressure of 10 kg/cm, with combination of a low-hardness roll with a type A durometer hardness of 70 and a metal high-hardness roll, and the roll temperature and machining speed were optimized for adjustment to the desired surface coverage, to obtain a packaging material for sterilization.

Example 21

Using a polyethylene resin in a spunbond method, a long fiber group of filaments was extruded toward a moving collection net and spun at a spinning speed of 4500 m/min and a spinning temperature of 160° C., forming a thermoplastic resin long fiber web on the collection net to produce a nonwoven fabric. A web was blasted by the following melt-blown method onto the spunbonded nonwoven fabric. Using a PP resin as the fiber material, the molten PE resin was extruded with an extruder. The PE resin melting temperature, spinning gas temperature and molten resin single-hole throughput in the extruder were appropriately selected for tow thinning of the thermoplastic resin. SB spinning fibers similar to those described above were then blown onto the MB nonwoven fabric to produce an SB-MB-SB layered nonwoven fabric. The obtained web was then subjected to calendering at a linear pressure of 10 kg/cm, using a combination of a low-hardness roll with a type A durometer hardness of 70 and a high-hardness roll, and adjusted to the desired void percentage to obtain a packaging material for sterilization.

Example 22

Using a polypropylene resin in a spunbond method, a long fiber group of filaments was extruded toward a moving collection net and spun at a spinning speed of 4500 m/min and a spinning temperature of 230° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder. The PP resin melting temperature, spinning gas temperature and molten resin single-hole throughput in the extruder were appropriately selected for tow thinning of the thermoplastic resin. Fusion by contact between the fibers was inhibited by adjusting the hole pitch of the spinneret and the degree of stretching and flow of cooling air, thereby achieving homogeneous dispersion of the fibers. SB spinning fibers similar to those described above were then blown onto the MB nonwoven fabric to produce an SB-MB-SB layered nonwoven fabric. A flat irregular spinneret was used as the SB spinneret. The obtained web was then subjected to flat calendering at a linear pressure of 10 kg/cm, with combination of a low-hardness roll with a type A durometer hardness of 70 and a metal high-hardness roll, and the roll temperature and machining speed were optimized for adjustment to the desired surface coverage, to obtain a packaging material for sterilization.

Comparative Examples 1 and 2

Using a polypropylene resin in a spunbond method, a long fiber group of filaments was extruded toward a moving collection net and spun at a spinning speed of 4500 m/min and a spinning temperature of 230° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder from a spinneret nozzle with a spinneret nozzle diameter of 0.22 mm. The PP resin melting temperature, spinning gas temperature and molten resin single-hole throughput in the extruder were appropriately selected for tow thinning of the thermoplastic resin. SB spinning fibers similar to those described above were then blown onto the MB nonwoven fabric to produce an SB-MB-SB layered nonwoven fabric. The obtained web was then subjected to calendering at a linear pressure of 40 kg/cm using a roll with a type A durometer hardness of 100, to obtain a packaging material for sterilization.

Comparative Examples 3 and 4

Using a polypropylene resin in a spunbond method, a long fiber group of filaments was extruded toward a moving collection net and spun at a spinning speed of 4500 m/min and a spinning temperature of 230° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder from a spinneret nozzle with a spinneret nozzle diameter of 0.22 mm. The PP resin melting temperature, spinning gas temperature and molten resin single-hole throughput in the extruder were appropriately selected for tow thinning of the thermoplastic resin. SB spinning fibers similar to those described above were then blown onto the MB nonwoven fabric to produce an SB-MB-SB layered nonwoven fabric. The obtained web was then subjected to calendering at a linear pressure of 10 kg/cm using a roll with a type A durometer hardness of 100, to obtain a packaging material for sterilization.

Comparative Examples 5 and 6

Using a polyester resin in a spunbond method, a long fiber group of filaments was extruded toward a moving collection net and spun at a spinning speed of 4500 m/min and a spinning temperature of 300° C., forming a thermoplastic resin long fiber web on the collection net to produce a nonwoven fabric. A web was blasted by the following melt-blown method onto the spunbonded nonwoven fabric. Using a PP resin as the fiber material, the molten PP resin was extruded with an extruder from a spinneret nozzle with a spinneret nozzle diameter of 0.22 mm. The PP resin melting temperature, spinning gas temperature and molten resin single-hole throughput in the extruder were appropriately selected for tow thinning of the thermoplastic resin. SB spinning fibers similar to those described above were then blown onto the MB nonwoven fabric to produce an SB-MB-SB layered nonwoven fabric. The obtained web was then subjected to calendering at a linear pressure of 10 kg/cm using a rubber roll, and adjusted to the desired void percentage to obtain a packaging material for sterilization.

Comparative Example 7

A long fiber web was obtained by a spunbond method in the same manner as Example 1, under conditions with a single-hole throughput of 2.0 g/(min hole). The fiber diameter was adjusted by limiting the attraction air speed to the range of 400 m³/hr/m. A calendar flat roll was also used for integration while the thickness and apparent density were adjusted to the desired thickness to obtain a nonwoven fabric.

The nonwoven fabric structures of Examples 1 to 22 and Comparative Examples 1 to 7, and the properties of the obtained nonwoven fabrics, are shown in Tables 1-1 to 1-4 below.

TABLE 1

| | Layered nonwoven fabric | | | | | | | | | | |
|---|---|---|---|---|---|---|---|---|---|---|---|
| | Material | Resin density g/cm³ | Basis weight g/m² | Thickness μm | Peel strength N/25 mm | Clean peel property — | Gurley gas permeability s/100 mL | Weight-average fiber diameter μm | Formation coefficient — | MD Tensile strength N/25 mm | CD Tensile strength N/25 mm | Tensile strength MD/CD ratio — |
| Example 1 | PP | 0.91 | 50 | 118 | 15 | G | 2.2 | 10.8 | 3.2 | 97 | 35 | 2.8 |
| Example 2 | PP | 0.91 | 50 | 89 | 9 | G | 2.6 | 10.8 | 3.3 | 90 | 33 | 2.7 |
| Example 3 | PP | 0.91 | 50 | 134 | 18 | G | 1.8 | 10.8 | 3.6 | 87 | 30 | 2.9 |
| Example 4 | PP | 0.91 | 50 | 109 | 19 | G | 2.3 | 11.1 | 3.2 | 82 | 28 | 2.9 |
| Example 5 | PP | 0.91 | 50 | 121 | 16 | G | 3.2 | 8.9 | 3.1 | 98 | 34 | 2.9 |
| Example 6 | PP | 0.91 | 50 | 123 | 14 | G | 8.8 | 5.5 | 2.8 | 87 | 31 | 2.8 |
| Example 7 | PP | 0.91 | 30 | 70 | 18 | G | 0.8 | 8.9 | 4.1 | 69 | 28 | 2.5 |
| Example 8 | PP | 0.91 | 80 | 280 | 19 | G | 2.2 | 16.0 | 3.2 | 138 | 43 | 3.0 |
| Example 9 | PET | 1.38 | 60 | 121 | 18 | G | 2.1 | 16.9 | 2.5 | 104 | 36 | 2.9 |
| Example 10 | PET | 1.38 | 70 | 142 | 22 | G | 4.8 | 14.5 | 1.9 | 118 | 43 | 2.7 |
| Example 11 | PET | 1.38 | 60 | 111 | 19 | G | 1.8 | 18.3 | 2.9 | 100 | 35 | 2.9 |
| Example 12 | PET | 1.38 | 60 | 124 | 17 | G | 3.5 | 16.7 | 1.8 | 110 | 40 | 2.8 |
| Example 13 | PET | 1.38 | 70 | 140 | 23 | G | 2.5 | 6.5 | 1.5 | 119 | 45 | 2.6 |
| Example 14 | PET | 1.38 | 30 | 74 | 12 | G | 1.1 | 6.8 | 3.6 | 72 | 31 | 2.3 |
| Example 15 | PP | 0.91 | 60 | 135 | 10 | G | 2.7 | 12.7 | 2.0 | 113 | 45 | 2.5 |
| Example 16 | PP | 0.91 | 60 | 122 | 10 | G | 5.4 | 10.7 | 1.9 | 110 | 43 | 2.6 |
| Example 17 | PP | 0.91 | 60 | 121 | 9 | G | 8.3 | 9.1 | 1.7 | 109 | 44 | 2.5 |
| Example 18 | PP | 0.91 | 60 | 130 | 10 | G | 2.9 | 10.3 | 2.1 | 121 | 53 | 2.3 |
| Example 19 | PP | 0.91 | 30 | 71 | 10 | G | 1.4 | 10.1 | 3.2 | 71 | 31 | 2.3 |
| Example 20 | PP | 0.91 | 80 | 185 | 11 | G | 3.4 | 13.8 | 1.6 | 145 | 70 | 2.1 |
| Example 21 | PE | 0.92 | 50 | 110 | 24 | G | 2.1 | 11.9 | 2.4 | 81 | 33 | 2.5 |
| Example 22 | PP | 0.91 | 50 | 102 | 27 | G | 2.8 | 13.8 | 4.8 | 88 | 32 | 2.8 |

TABLE 2

| | Layered nonwoven fabric | | | | | | | |
|---|---|---|---|---|---|---|---|---|
| | Puncture strength N | MD Tear strength N | CD Tear strength N | Average flow pore diameter μm | Bubble point μm | Water pressure resistance cmH$_2$O | Trapping efficiency % | Surface coverage % |
| Example 1 | 148 | 1.5 | 3.2 | 2.6 | 7.4 | 80 | 99.8 | 70 |
| Example 2 | 160 | 1.3 | 2.5 | 2.2 | 6.5 | 78 | 98.2 | 81 |
| Example 3 | 138 | 1.8 | 3.7 | 2.7 | 7.7 | 65 | 99.9 | 67 |
| Example 4 | 140 | 1.7 | 3.6 | 2.8 | 9.7 | 70 | 99.5 | 72 |
| Example 5 | 155 | 2.9 | 4.8 | 1.9 | 4.6 | 96 | 99.9 | 64 |
| Example 6 | 145 | 1.9 | 3.4 | 1.3 | 3.9 | 108 | 100 | 58 |
| Example 7 | 94 | 1.0 | 2.8 | 3.2 | 10.5 | 54 | 97.5 | 71 |
| Example 8 | 255 | 2.8 | 5.6 | 2.1 | 5.3 | 130 | 99.8 | 55 |
| Example 9 | 182 | 2.1 | 4.3 | 2.1 | 6.0 | 43 | 97.5 | 54 |
| Example 10 | 205 | 2.6 | 5.1 | 2.8 | 7.2 | 50 | 98.3 | 63 |
| Example 11 | 170 | 2.0 | 4.2 | 1.8 | 5.5 | 34 | 95.8 | 59 |
| Example 12 | 201 | 2.1 | 4.1 | 1.7 | 5.3 | 52 | 98.0 | 62 |
| Example 13 | 205 | 2.2 | 4.6 | 1.5 | 4.2 | 58 | 98.2 | 79 |
| Example 14 | 76 | 0.9 | 3.1 | 4.8 | 11.9 | 25 | 98.4 | 64 |
| Example 15 | 162 | 2.1 | 3.8 | 2.5 | 6.9 | 95 | 98.8 | 88 |
| Example 16 | 170 | 2.0 | 4.2 | 2.1 | 7.2 | 99 | 99.8 | 91 |
| Example 17 | 175 | 1.9 | 3.8 | 1.8 | 6.5 | 102 | 99.9 | 92 |
| Example 18 | 177 | 2.1 | 3.6 | 2.4 | 6.8 | 89 | 97.7 | 91 |
| Example 19 | 222 | 3.5 | 7.9 | 2.8 | 9.8 | 44 | 98.2 | 92 |
| Example 20 | 101 | 1.0 | 1.8 | 2.2 | 5.8 | 112 | 97.3 | 89 |
| Example 21 | 135 | 1.8 | 3.2 | 2.7 | 7.3 | 77 | 97.8 | 68 |
| Example 22 | 121 | 1.1 | 2.8 | 2.5 | 7.4 | 69 | 99.7 | 38 |

| | Fiber layer (I) | | | Fiber layer (II) | | |
|---|---|---|---|---|---|---|
| | Fiber diameter μm | Void percentage % | Thickness μm | Fiber diameter μm | Specific surface area m$^2$/g | 1 cm-equivalent thread count per 1 mg cm/mg |
| Example 1 | 12 | 45 | 40 | 1.1 | 1.8 | 1,156 |
| Example 2 | 12 | 31 | 32 | 1.1 | 1.8 | 1,156 |
| Example 3 | 12 | 59 | 54 | 1.1 | 1.8 | 1,156 |
| Example 4 | 12 | 42 | 38 | 1.2 | 1.5 | 1,012 |
| Example 5 | 12 | 52 | 46 | 0.5 | 3.2 | 5,597 |
| Example 6 | 12 | 50 | 44 | 0.1 | 7.8 | 139,916 |
| Example 7 | 10 | 48 | 32 | 1.1 | 1.7 | 1,250 |
| Example 8 | 15 | 55 | 85 | 1.1 | 1.8 | 1,108 |
| Example 9 | 20 | 58 | 43 | 1.1 | 1.5 | 837 |
| Example 10 | 20 | 55 | 40 | 0.9 | 1.7 | 1,090 |
| Example 11 | 20 | 45 | 33 | 0.9 | 1.6 | 1,114 |
| Example 12 | 20 | 43 | 32 | 0.3 | 3.8 | 9,010 |
| Example 13 | 9 | 55 | 40 | 0.3 | 4.0 | 10,252 |
| Example 14 | 10 | 52 | 15 | 0.3 | 3.8 | 9,601 |
| Example 15 | 14 | 43 | 48 | 1.2 | 1.8 | 1,005 |
| Example 16 | 14 | 39 | 45 | 0.7 | 2.8 | 2,699 |
| Example 17 | 14 | 36 | 43 | 0.3 | 5.0 | 16,637 |
| Example 18 | 11 | 40 | 46 | 1.2 | 1.7 | 972 |
| Example 19 | 11 | 56 | 25 | 1.1 | 1.8 | 1,178 |
| Example 20 | 15 | 56 | 88 | 1.3 | 1.5 | 815 |
| Example 21 | 13 | 59 | 53 | 1.2 | 1.7 | 961 |
| Example 22 | 16 | 60 | 55 | 1.1 | 1.7 | 1,110 |

TABLE 3

| | | Layered nonwoven fabric | | | | | | | | | | |
|---|---|---|---|---|---|---|---|---|---|---|---|---|
| | Material | Resin density G/cm$^2$ | Basis weight G/m$^2$ | Thickness μm | Peel strength N/25 mm | Clean peel property — | Gurley gas permeability S/100 mL | Weight-average fiber diameter μm | Formation coefficient — | MD Tensile strength N/25 mm | CD Tensile strength N/25 mm | Tensile strength MD/CD ratio — |
| Comp. Ex. 1 | PP | 0.91 | 50 | 82 | 19 | G | 2.2 | 11.0 | 2.4 | 89 | 35 | 2.5 |
| Comp. Ex. 2 | PP | 0.91 | 50 | 71 | 19 | G | 2.2 | 11.2 | 2.3 | 95 | 42 | 2.3 |
| Comp. Ex. 3 | PP | 0.91 | 45 | 161 | 31 | x | 11.4 | 5.4 | 2.1 | 84 | 34 | 2.5 |
| Comp. Ex. 4 | PP | 0.91 | 50 | 154 | 30 | x | 2.3 | 11.1 | 2.5 | 88 | 40 | 2.2 |
| Comp. Ex. 5 | PET | 1.38 | 50 | 72 | 20 | G | 2.8 | 10.4 | 2.2 | 97 | 34 | 2.9 |
| Comp. Ex. 6 | PET | 1.38 | 50 | 95 | 35 | x | 1.2 | 10.8 | 2.3 | 88 | 33 | 2.7 |
| Comp. Ex. 7 | PET | 1.38 | 70 | 322 | 37 | x | 0.3 | 37.0 | 8.9 | 61 | 28 | 2.5 |

TABLE 4

| | Layered nonwoven fabric | | | | | | | |
|---|---|---|---|---|---|---|---|---|
| | Puncture strength N | MD Tear strength N | CD Tear strength N | Average flow pore size μm | Bubble point μm | Water pressure resistance cmH$_2$O | Trapping efficiency % | Surface coverage % |
| Comp. Ex. 1 | 155 | 1.7 | 4.0 | 2.3 | 8.4 | 70 | 92.8 | 56 |
| Comp. Ex. 2 | 170 | 1.4 | 2.8 | 2.2 | 5.9 | 77 | 90.9 | 53 |
| Comp. Ex. 3 | 133 | 1.7 | 3.2 | 2.6 | 7.3 | 84 | 99.9 | 55 |
| Comp. Ex. 4 | 148 | 1.9 | 4.3 | 2.8 | 9.2 | 78 | 93.9 | 38 |
| Comp. Ex. 5 | 150 | 2.0 | 3.9 | 2.5 | 8.1 | 69 | 94.3 | 60 |
| Comp. Ex. 6 | 155 | 1.8 | 3.9 | 2.3 | 7.5 | 50 | 76.3 | 36 |
| Comp. Ex. 7 | 48 | 15.9 | 31.2 | 35.1 | 108.2 | 7 | 75.3 | 29 |

| | Fiber layer (I) or (A) | | | Fiber layer (II) or (B) | | |
|---|---|---|---|---|---|---|
| | Fiber diameter μm | Void percentage % | Thickness μm | Fiber diameter μm | Specific surface area m$^2$/g | 1 cm-equivalent thread count per 1 mg cm/mg |
| Comp. Ex. 1 | 12 | 40 | 37 | 1.8 | 0.8 | 432 |
| Comp. Ex. 2 | 12 | 31 | 32 | 2.1 | 0.6 | 317 |
| Comp. Ex. 3 | 12 | 70 | 72 | 0.1 | 8.0 | 115,633 |
| Comp. Ex. 4 | 15 | 68 | 69 | 1.0 | 2.8 | 1,319 |
| Comp. Ex. 5 | 12 | 44 | 32 | 1.1 | 1.2 | 640 |
| Comp. Ex. 6 | 12 | 58 | 43 | 2.1 | 0.5 | 209 |
| Comp. Ex. 7 | 37 | 84 | 322 | — | — | — |

INDUSTRIAL APPLICABILITY

Since the nonwoven fabric for a sterilization packaging material according to the first embodiment of the invention is provided with both an easy-peeling property and a barrier property, by layering a low-porosity fiber layer and a fiber layer with a high specific surface area and a high thread count, and the nonwoven fabric for a sterilization packaging material according to the second embodiment of the invention is a nonwoven fabric having a specific fiber structure and a highly controlled pore diameter allowing it to be produced with satisfactory yield and low cost while having high strength and a suitable pore diameter, they can be applied to various sterilization processing methods, and a highly sterile state can be maintained in the packaging materials, making them suitable for use as sterilization packaging materials for medical equipment for the purpose of preventing infectious disease.

The invention claimed is:

1. A nonwoven fabric for a sterilization packaging material having a fiber layer (I) with a void percentage of 30% to 60%, as a surface layer heat seal surface, and a fiber layer (II) with a fiber specific surface area of 1.0 $m^2$/g to 10 $m^2$/g and a 1 cm-equivalent thread count of between 800 and 1,000,000 per 1 mg, as a barrier layer, wherein the fiber layer (I) and the fiber layer (II) are layered and a surface coverage of 50% to 95% and the heat seal strength of the fiber layer (I) is 8 N/25 mm to 23 N/25 mm.

2. The nonwoven fabric for a sterilization packaging material according to claim 1, wherein the fibers composing the fiber layer (II) are polypropylene fibers.

3. The nonwoven fabric for a sterilization packaging material according to claim 1, wherein the fiber diameters of the fibers composing the fiber layer (I) are 5 μm to 30 μm, and the fiber diameters of the fibers composing the fiber layer (II) are 0.05 μm to 5 μm.

4. The nonwoven fabric for a sterilization packaging material according to claim 1, wherein the fiber diameters of the fibers composing the fiber layer (I) are 5 μm to 20 μm.

5. The nonwoven fabric for a sterilization packaging material according to claim 1, which includes at least one layer of the fiber layer (I) and at least two layers of the fiber layer (II).

6. The nonwoven fabric for a sterilization packaging material according to claim 1, wherein the total basis weight is 20 g/$m^2$ to 100 g/$m^2$.

7. The nonwoven fabric for a sterilization packaging material according to claim 1, wherein the gas permeability in a Gurley gas permeability test is 0.1 sec/100 mL to 100 sec/100 mL.

8. The nonwoven fabric for a sterilization packaging material according to claim 1, wherein the gas permeability in a Gurley gas permeability test is 0.1 sec/100 mL to 20 sec/100 mL.

9. The nonwoven fabric for a sterilization packaging material according to claim 1, wherein the total thickness is 50 μm to 300 μm.

* * * * *